United States Patent
Mangla et al.

(10) Patent No.: US 11,032,203 B2
(45) Date of Patent: Jun. 8, 2021

(54) PROVIDING PREDICTABLE QUALITY OF SERVICE TRAFFIC STEERING

(71) Applicant: Juniper Networks, Inc., Sunnyvale, CA (US)

(72) Inventors: Umesh Mangla, Sunnyvale, CA (US); Johan Andersson, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 124 days.

(21) Appl. No.: 16/395,815

(22) Filed: Apr. 26, 2019

(65) Prior Publication Data

US 2020/0344173 A1    Oct. 29, 2020

(51) Int. Cl.
*H04L 12/725* (2013.01)
*H04L 12/801* (2013.01)
(Continued)

(52) U.S. Cl.
CPC ........ *H04L 47/2441* (2013.01); *H04L 47/125* (2013.01); *H04L 47/127* (2013.01);
(Continued)

(58) Field of Classification Search
None
See application file for complete search history.

(56) References Cited

U.S. PATENT DOCUMENTS

2004/0117653 A1* 6/2004 Shapira ............... H04L 63/0485
726/15

2009/0156213 A1* 6/2009 Spinelli ................ H04W 76/12
455/436
(Continued)

OTHER PUBLICATIONS

3GPP., "3rd Generation Partnership Project; Technical Specification Group Core Network and Terminals; 3GPP System to Wireless Local Area Network (WLAN) interworking; WLAN User Equipment (WLAN UE) to network protocols; Stage 3 (Release 11)", 3GPP Draft, 24234-B30, France, Jun. 25, 2012, vol. TSG SA(V11. 3.0), 41 pages, XP051673999 [Retrieved on Jun. 25, 2012] Retrieved from the internet [URL: https://www.3gpp.org/ftp/tsg_sa/TSG_SA/TSGS_60/GCS_for_M.2012-1/2012-03_m.2012-1/Rel-11/24_series/24234-b30.zip.

(Continued)

*Primary Examiner* — Sai Aung
*Assistant Examiner* — Liem H. Nguyen
(74) *Attorney, Agent, or Firm* — Harrity & Harrity, LLP

(57) ABSTRACT

A first network device of a network receives first traffic and second traffic, and assigns a first priority to the first traffic and a second priority to the second traffic. The first network device provides, to a second network device, a first message requesting whether the second network device can process the first traffic, and receives, from the second network device, a first response with a first value indicating that the second network device can process the first traffic. The first network device establishes, with the second network device, a path that includes a first security association and a second security association. The first network device provides, to the second network device, the first traffic with the first priority, via the first security association of the path, and the second traffic with the second priority, via the second security association of the path.

20 Claims, 14 Drawing Sheets

(51) Int. Cl.
*H04L 12/803* (2013.01)
*H04L 12/851* (2013.01)
*H04L 29/06* (2006.01)

(52) U.S. Cl.
CPC ...... *H04L 47/2433* (2013.01); *H04L 63/0428* (2013.01); *H04L 63/061* (2013.01); *H04L 63/166* (2013.01)

(56) References Cited

U.S. PATENT DOCUMENTS

| | | | | |
|---|---|---|---|---|
| 2010/0296395 | A1* | 11/2010 | Fukuda | H04L 47/10 370/230 |
| 2015/0382393 | A1* | 12/2015 | Kiss | H05K 999/99 370/328 |
| 2019/0059128 | A1* | 2/2019 | Gage | H04L 9/088 |

OTHER PUBLICATIONS

3GPP., "3rd Generation Partnership Project; Technical Specification Group Services and System Aspects, Study on Support of Voice Over WLAN, Enhancements (Release 15)", 3GPP Technical Report (TR 23.751), Mobile Competence Centre, France, Jun. 12, 2017, vol. SA WG2 (V15.0.0), pp. 1-26, XP051298398.
Extended European Search Report for Application No. EP19181906.9. dated Jan. 17, 2020, 10 pages.
C. Kaufman et al., "Internet Key Exchange Protocol Version 2 (IKEv2)", Oct. 2014, 142 pages.
S. Kent et al., "Security Architecture for the Internet Protocol", Dec. 2005, 101 pages.

* cited by examiner

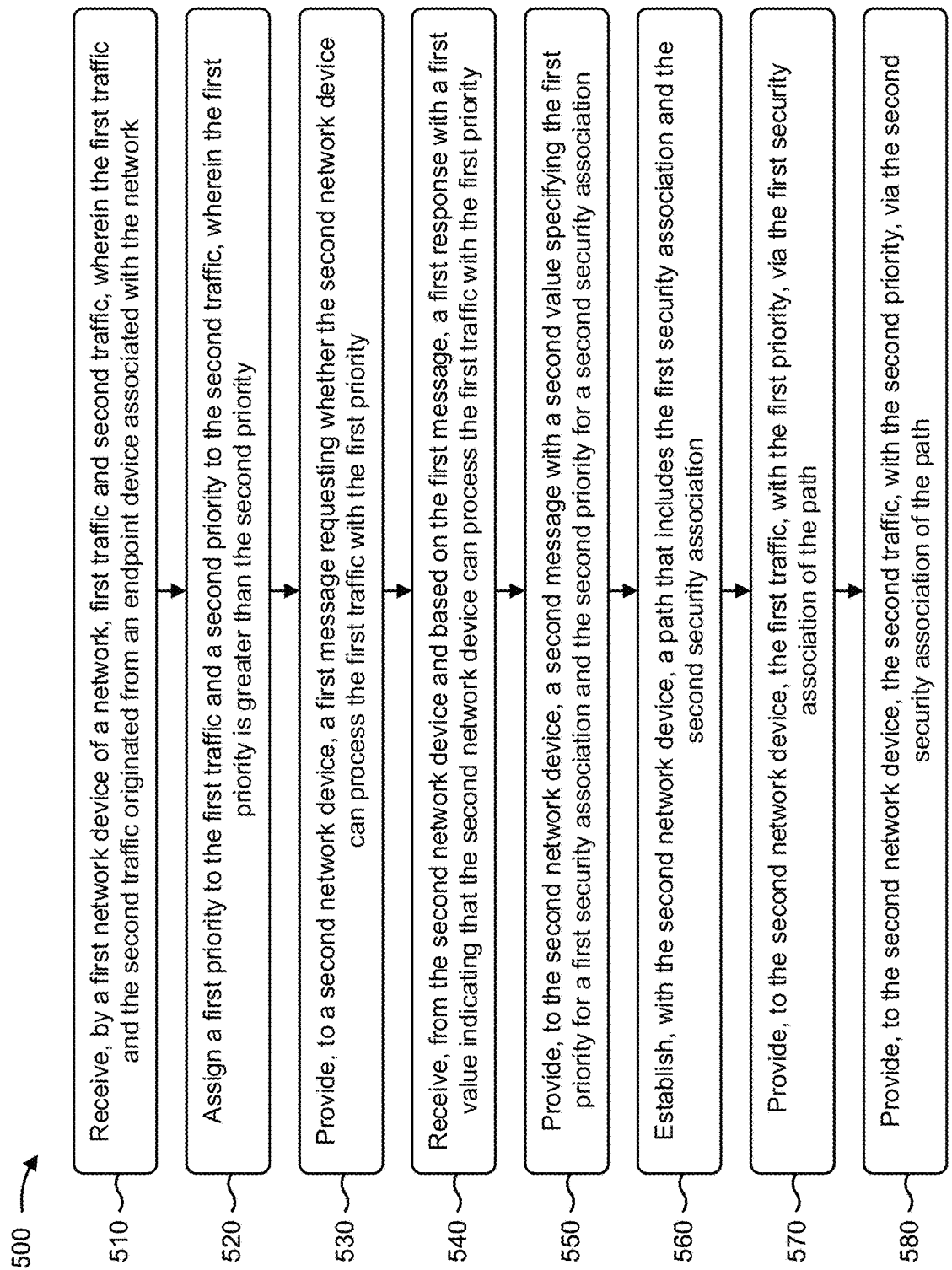

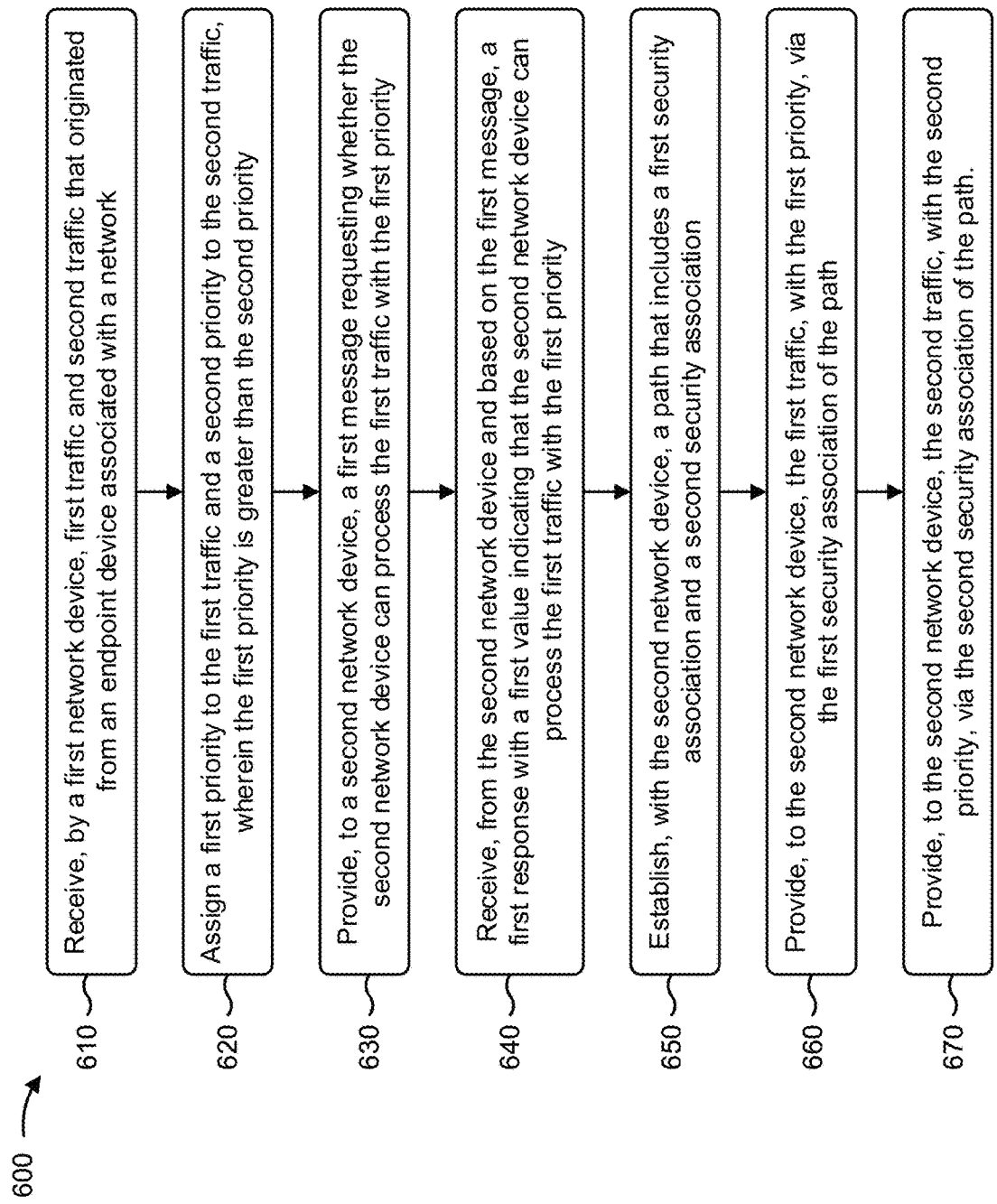

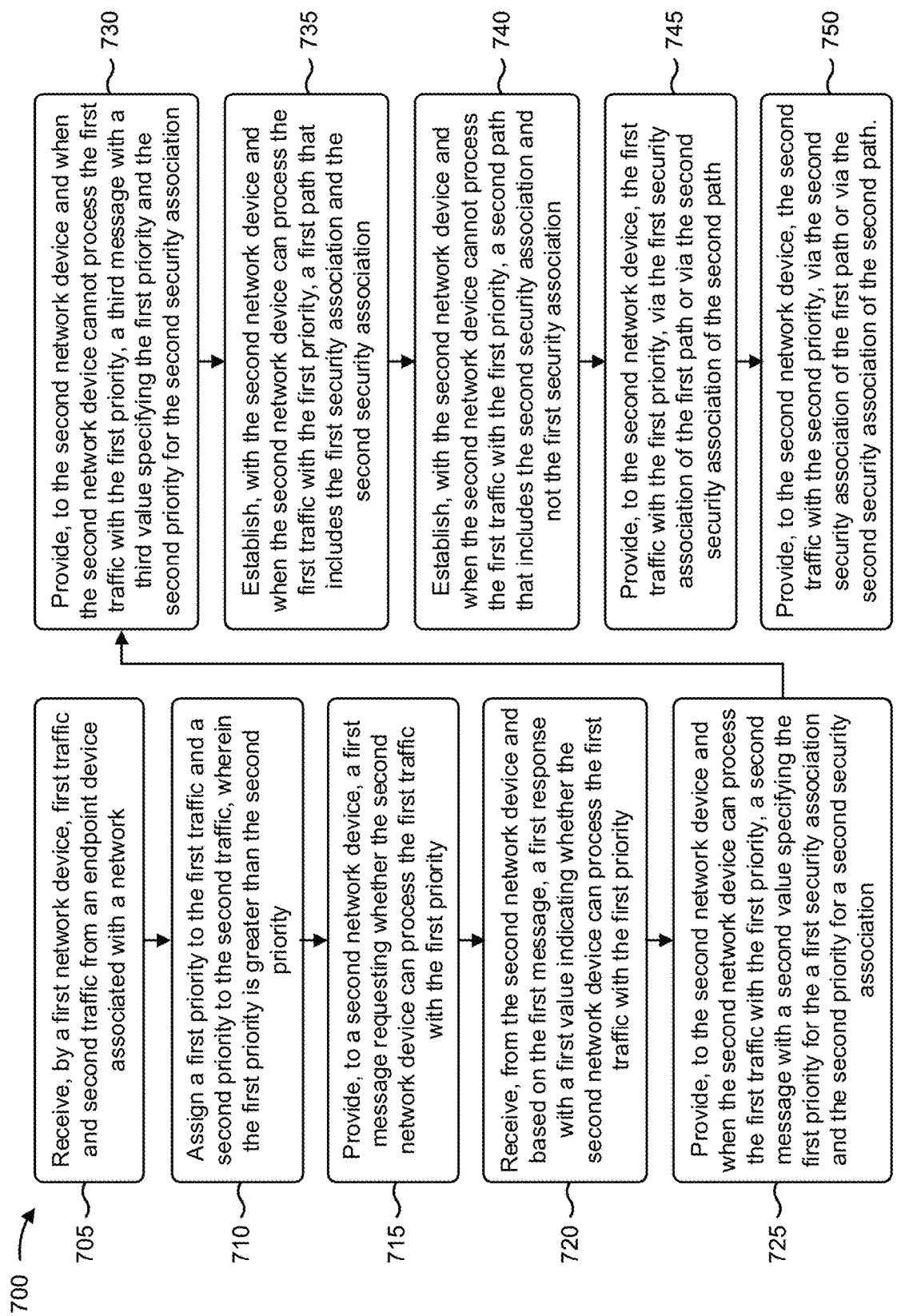

PROVIDING PREDICTABLE QUALITY OF SERVICE TRAFFIC STEERING

BACKGROUND

Internet protocol (IP) Security (IPSec) provides confidentiality, data integrity, access control, data source authentication, and/or the like to IP traffic. These services are provided by maintaining shared state between a source network device (e.g., a router, a gateway, and/or the like) and a destination network device of the IP traffic. The state defines specific services provided to the IP traffic, which cryptographic models will use to provide the services, keys used as input to the cryptographic models, and/or the like.

SUMMARY

According to some implementations, a method may include receiving, by a first network device of a network, first traffic and second traffic, wherein the first traffic and the second traffic may originate from an endpoint device associated with the network. The method may include assigning a first priority to the first traffic and a second priority to the second traffic, wherein the first priority may be greater than the second priority. The method may include providing, to a second network device, a first message requesting whether the second network device can process the first traffic with the first priority, and receiving, from the second network device and based on the first message, a first response with a first value indicating that the second network device can process the first traffic with the first priority. The method may include providing, to the second network device, a second message with a second value specifying the first priority for a first security association and the second priority for a second security association, and establishing, with the second network device, a path that includes the first security association and the second security association. The method may include providing, to the second network device, the first traffic, with the first priority, via the first security association of the path, and providing, to the second network device, the second traffic, with the second priority, via the second security association of the path.

According to some implementations, a first network device may include one or more memories, and one or more processors to receive first traffic and second traffic that originated from an endpoint device associated with a network, and assign a first priority to the first traffic and a second priority to the second traffic, wherein the first priority may be greater than the second priority. The one or more processors may provide, to a second network device, a first message requesting whether the second network device can process the first traffic with the first priority, and may receive, from the second network device and based on the first message, a first response with a first value indicating that the second network device can process the first traffic with the first priority. The one or more processors may establish, with the second network device, a path that includes a first security association and a second security association. The one or more processors may provide, to the second network device, the first traffic, with the first priority, via the first security association of the path, and may provide, to the second network device, the second traffic, with the second priority, via the second security association of the path.

According to some implementations, a non-transitory computer-readable medium may store one or more instructions that, when executed by one or more processors of a first network device, may cause the one or more processors to receive first traffic and second traffic from an endpoint device associated with a network, and assign a first priority to the first traffic and a second priority to the second traffic, wherein the first priority may be greater than the second priority. The one or more instructions may cause the one or more processors to provide, to a second network device, a first message requesting whether the second network device can process the first traffic with the first priority, and receive, from the second network device and based on the first message, a first response with a first value indicating whether the second network device can process the first traffic with the first priority. The one or more instructions may cause the one or more processors to provide, to the second network device and when the second network device can process the first traffic with the first priority, a second message with a second value specifying the first priority for a first security association and the second priority for a second security association. The one or more instructions may cause the one or more processors to provide, to the second network device and when the second network device cannot process the first traffic with the first priority, a third message with a third value specifying the first priority and the second priority for the second security association. The one or more instructions may cause the one or more processors to establish, with the second network device and when the second network device can process the first traffic with the first priority, a first path that includes the first security association and the second security association, and establish, with the second network device and when the second network device cannot process the first traffic with the first priority, a second path that includes the second security association and not the first security association. The one or more instructions may cause the one or more processors to provide, to the second network device, the first traffic with the first priority, via the first security association of the first path or via the second security association of the second path, and provide, to the second network device, the second traffic with the second priority, via the second security association of the first path or via the second security association of the second path.

BRIEF DESCRIPTION OF THE DRAWINGS

FIGS. 5-7 are flow charts of example processes for providing predictable quality of service traffic steering.

DETAILED DESCRIPTION

Figure 1A:
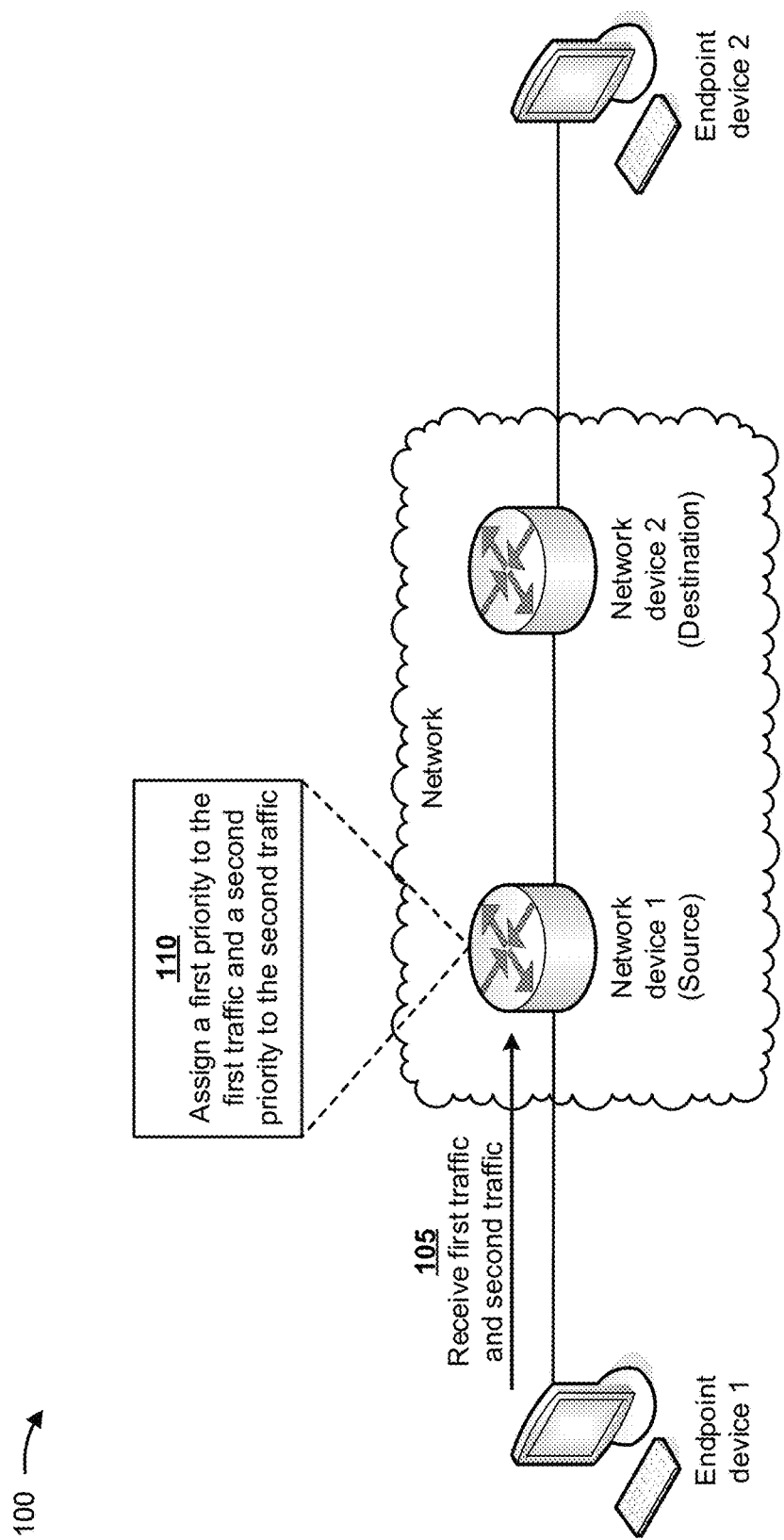
FIGS. 1A-1H are diagrams of one or more example implementations described herein.

The following detailed description of example implementations refers to the accompanying drawings. The same reference numbers in different drawings may identify the same or similar elements.

With IPSec in place to protect traffic in transit, network devices need to process even more traffic and require enhanced encryption and decryption capabilities. The introduction of parallel or serial processing of traffic in network devices causes the network devices to experience traffic (e.g., packet) fragmentation, packet reordering which drops packets that are not within an anti-replay window, and/or the like. Such functions introduce constraints on processing units of the network devices. In some network devices, processing units that control encryption and decryption services may be used for other purposes (e.g., creating a firewall) that impact a transport of traffic. For example, when receiving high priority traffic, a destination network device may treat the traffic as lower priority traffic. In another example, if a source network device does not send high priority traffic in a same queue, some high priority traffic may be transmitted in a high priority path and other high priority traffic may be transmitted in a lower priority path and experience congestion and delay. In still another example, packets of traffic may be reordered, may be transmitted via different paths, and may be incorrectly ordered by a destination network device.

Such impacts on the transport of traffic cause traffic outages in a network (e.g., that cause traffic to be lost, cause traffic to be delayed, require re-routing of traffic, and/or the like). This, in turn, wastes computing resources (e.g., processing resources, memory resources, and/or the like), network resources, and/or the like in identifying and/or correcting the traffic outage, re-routing traffic, locating lost traffic, and/or the like.

Some implementations described herein provide a network device that provides predictable quality of service traffic steering. For example, a first network device may receive first traffic and second traffic that originated from an endpoint device associated with a network, and may assign a first priority to the first traffic and a second priority to the second traffic, where the first priority may be greater than the second priority. The first network device may provide, to a second network device, a first message requesting whether the second network device can process the first traffic with the first priority, and may receive, from the second network device and based on the first message, a first response with a first value indicating that the second network device can process the first traffic with the first priority. The first network device may establish, with the second network device, a path that includes a first security association and a second security association. The first network device may provide, to the second network device, the first traffic, with the first priority, via the first security association of the path, and may provide, to the second network device, the second traffic, with the second priority, via the second security association of the path.

In this way, predictable quality of service traffic steering may be provided for a network, which reduces or prevents traffic outages in the network (e.g., that cause traffic to be lost, cause traffic to be delayed, require re-routing of traffic, and/or the like). This, in turn, conserves computing resources (e.g., processing resources, memory resources, and/or the like), network resources, and/or the like that would otherwise be wasted in identifying and/or correcting the traffic outage, re-routing traffic, locating lost traffic, and/or the like.

FIGS. 1A-1H are diagrams of one or more example implementations 100 described herein. As shown in FIG. 1A, a first endpoint device (e.g., endpoint device 1) may communicate and exchange traffic with a second endpoint device (e.g., endpoint device 2) via a network. The network may include multiple network devices (e.g., routers, gateways, and/or the like), such as a first network device (e.g., network device 1), a second network device (e.g., network device 2), and/or the like. The two network devices shown in FIGS. 1A-1H are provided merely as examples of network devices, and, in practice, the network may include additional network devices.

As further shown in FIG. 1A, and by reference number 105, the first network device may receive first traffic and second traffic that originated from the first endpoint device and is destined for the second endpoint device, via the network. In some implementations, the first traffic may include traffic to be provided a first priority (e.g., a high priority, a high quality of service, and/or the like), such as Voice over IP (VoIP) traffic, streaming video traffic, and/or the like. In some implementations, the second traffic may include traffic to be provided a second priority (e.g., a low or lower priority than the high priority, a low or lower quality of service than the high quality of service, and/or the like), such as traffic associated with data to be periodically uploaded, data that is not time sensitive, and/or the like.

As further shown in FIG. 1A, and by reference number 110, the first network device may assign the first priority to the first traffic and may assign the second priority to the second traffic. In some implementations, the first priority (e.g., the high priority, the high quality of service, and/or the like) may be greater than the second priority (e.g., the low or lower priority, the low or lower quality of service, and/or the like). In this way, the first network device may prioritize traffic (e.g., as high priority, low priority, and/or the like) to be provided, through the network, to the second network device. This may enable the second network device to process the traffic accordingly based on the priority. This may also enable the first network device to transmit high priority traffic via a high priority path through the network so that such traffic does not experience congestion, packet loss, and/or the like.

Figure 1B:
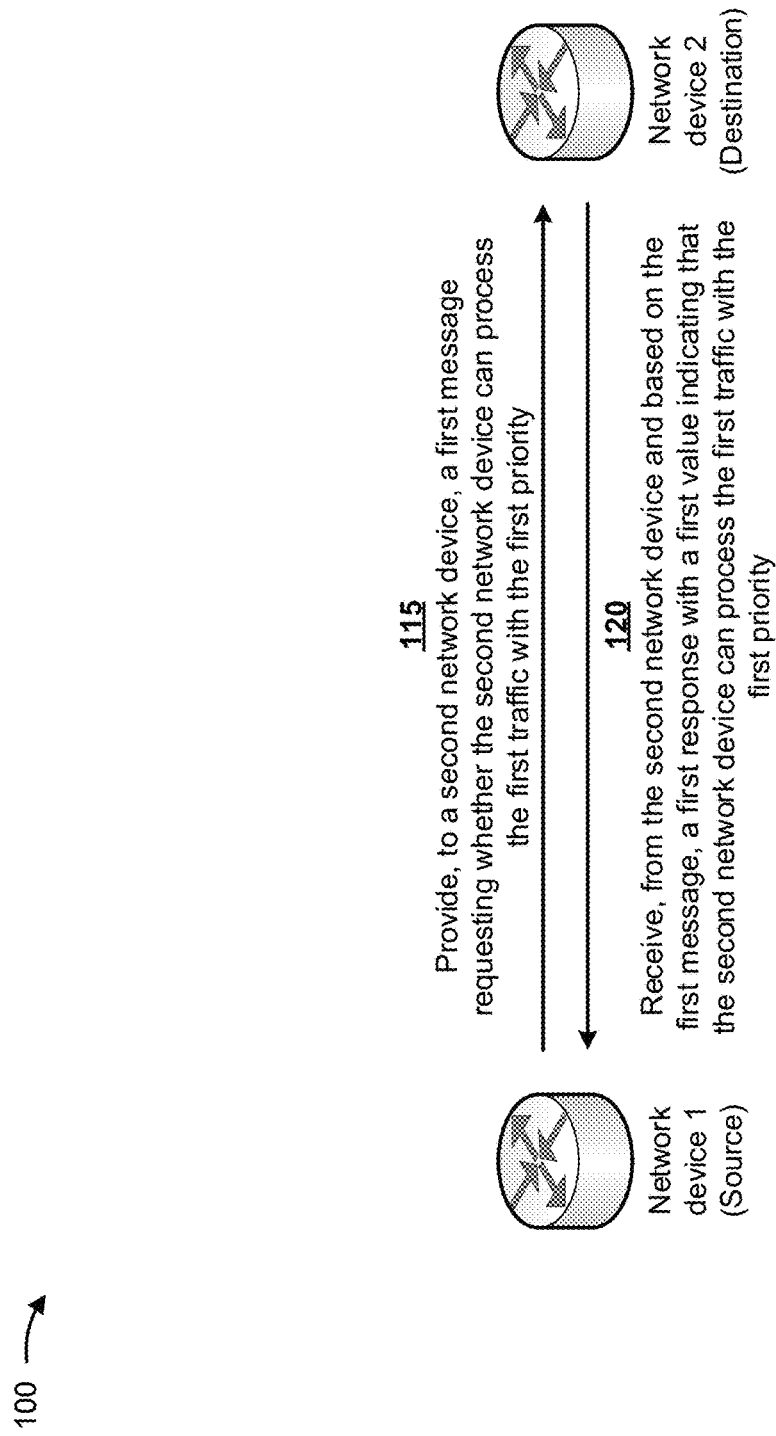

As shown in FIG. 1B, and by reference number 115, the first network device may provide, to the second network device, a first message requesting whether the second network device can process the first traffic with the first priority. In some implementations, the first message may include a first authentication type (e.g., Internet key exchange (IKE), shared keys, certificate, and/or the like) message. IKE may include a protocol that establishes a shared state between the first network device and the second network device. The shared state defines specific services provided to traffic, which cryptographic models will be utilized to provide the specific services, keys utilized as input to the cryptographic models, parameters for communication of the traffic, and/or the like. IKE may perform a mutual authentication between the first network device and the second network device, and may establish an IKE security association (SA) that includes shared secret information that can be used to efficiently establish security associations for an encapsulating security payload (ESP) or an authentication header (AH) and a set of cryptographic models to be used by the security associations to protect traffic carried by the security associations.

As further shown in FIG. 1B, and by reference number 120, the first network device may receive, from the second network device and based on the first message, a first response (e.g., an IKE message) with a first value indicating that the second network device can process the first traffic with the first priority. In some implementations, the second network device may generate a value (e.g., the first value included in the first response) that indicates whether the second network device is capable of processing traffic designated as high priority. For example, the value may indicate that the second network device is enabled or non-enabled for processing high priority traffic. In another example, the value may indicate a quantity of security associations supported by the second network device. If the first network device and the second network device do not support the same quantity of security associations, the value may indicate that the second network device is unable to process high priority traffic. In still another example, the value may indicate whether the second network device should receive (e.g., pull) parameters for processing the high priority traffic from the first network device or should provide (e.g., push) the parameters to the first network device.

Figure 1C:
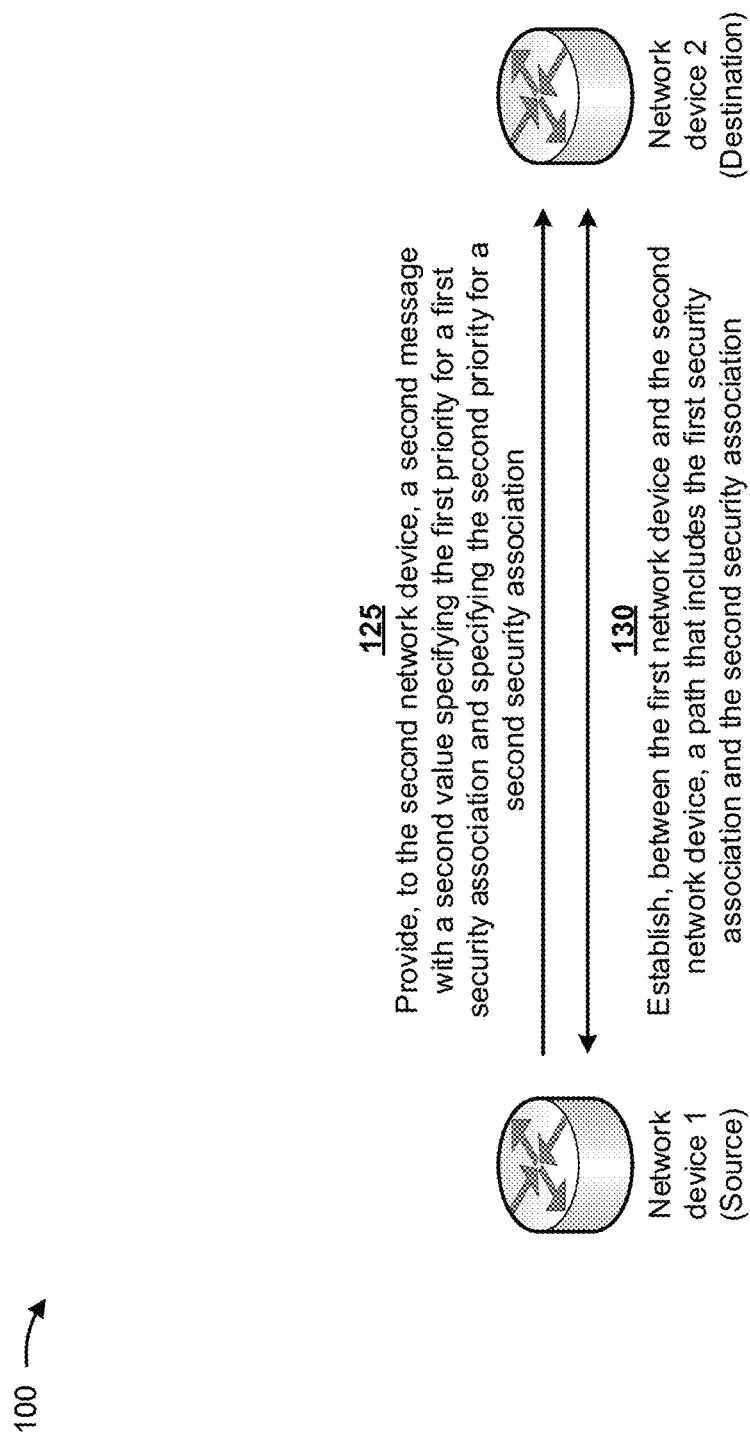

As shown in FIG. 1C, and by reference number 125, the first network device may provide, to the second network device, a second message with a second value specifying the first priority for a first security association and specifying the second priority for a second security association. In some implementations, the second message may include a second IKE message. In some implementations, the second value of the second message may include an IKE payload type value that indicates which priority or quality of service traffic is to be carried over each of the security associations negotiated between the first network device and the second network device. For example, the second value may indicate that the first traffic with the first priority is to be carried over the first security association, and that the second traffic with the second priority is to be carried over the second security association.

In some implementations, the first security association may provide shared security attributes between the first network device and the second network device to support secure communication of the first traffic, and the second security association may provide the shared security attributes between the first network device and the second network device to support secure communication of the second traffic. The shared security attributes may include an attribute identifying a first cryptographic model for the first security association, an attribute identifying a first traffic encryption key for the first cryptographic model, an attribute identifying parameters for communication of the first traffic via the path, an attribute identifying a second cryptographic model for the second security association, an attribute identifying a second traffic encryption key for the second cryptographic model, an attribute identifying parameters for communication of the second traffic via the path, and/or the like.

As further shown in FIG. 1C, and by reference number 130, the first network device may establish, between the first network device and the second network device, a path that includes the first security association and the second security association. In some implementations, the first security association of the path may be utilized to transmit the first traffic with the first priority, and the second security association of the path may be utilized to transmit the second traffic with the second priority.

Figure 1D:
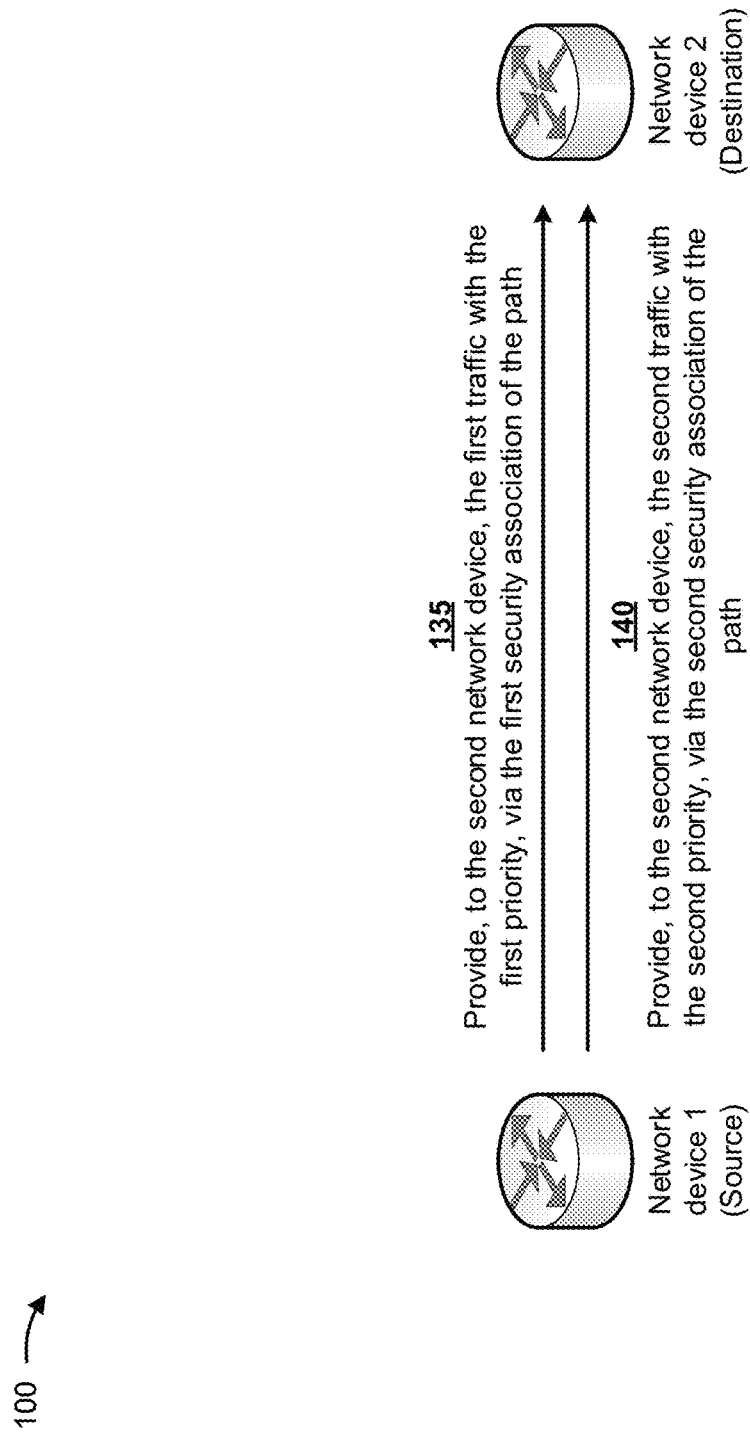

As shown in FIG. 1D, and by reference number 135, the first network device may provide, to the second network device, the first traffic with the first priority, via the first security association of the path. For example, the first network device may encrypt the first traffic with the first cryptographic model and the first traffic encryption key, and may provide the encrypted first traffic to the second network device via the path. The second network device may receive the encrypted first traffic, and may decrypt the encrypted first traffic with the first cryptographic model and the first traffic encryption key.

As further shown in FIG. 1D, and by reference number 140, the first network device may provide, to the second network device, the second traffic with the second priority, via the second security association of the path. For example, the first network device may encrypt the second traffic with the second cryptographic model and the second traffic encryption key, and may provide the encrypted second traffic to the second network device via the path. The second network device may receive the encrypted second traffic, and may decrypt the encrypted second traffic with the second cryptographic model and the second traffic encryption key.

Figure 1E:
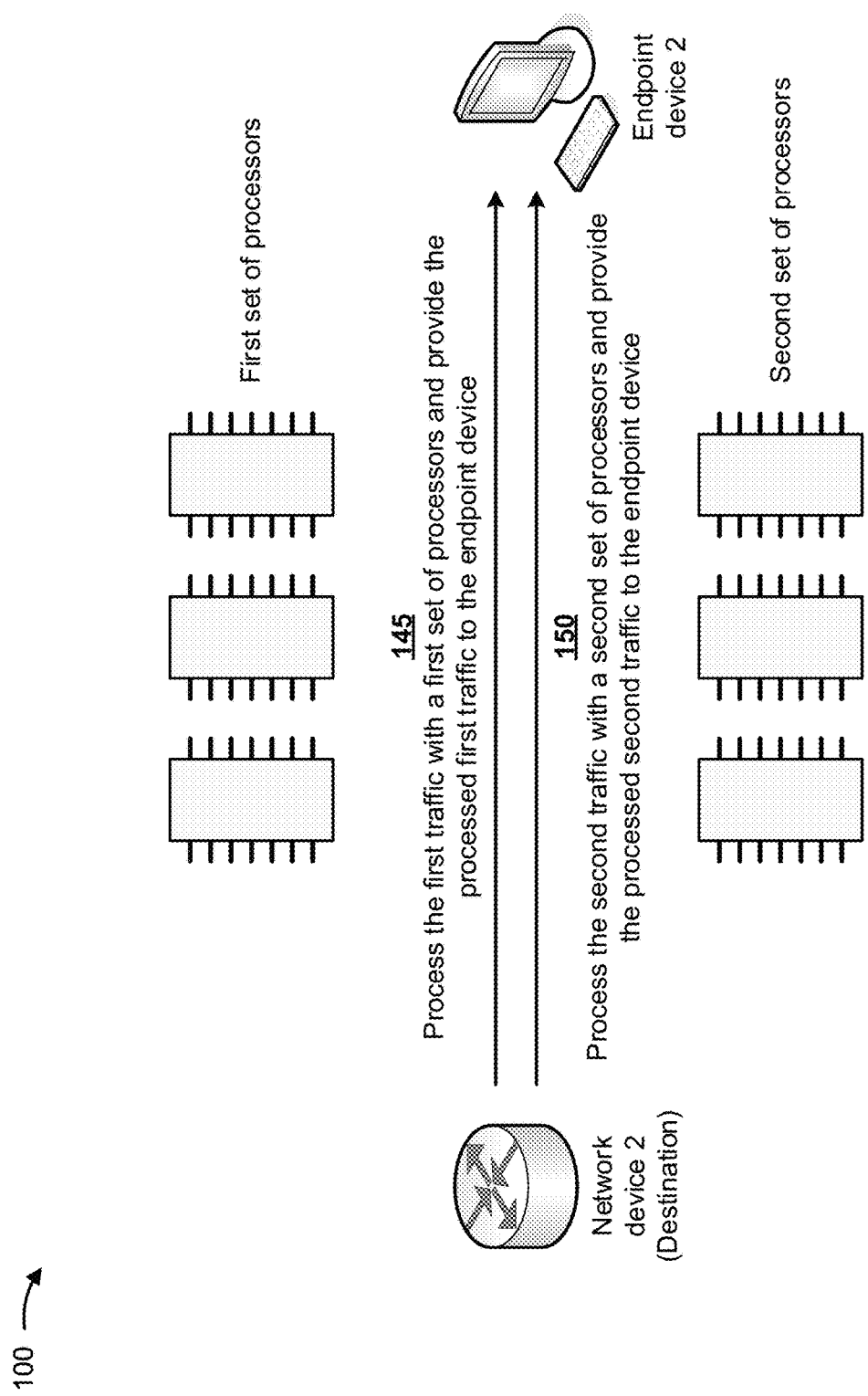

As shown in FIG. 1E, and by reference number 145, the second network device may process the first traffic with a first set of processors to generate processed first traffic, and may provide the processed first traffic to the second endpoint device. In some implementations, the first set of processors may be dedicated to the first security association so that the first set of processors can process the first traffic with the first priority (e.g., high priority traffic). The first set of processors may include processors capable of processing high priority traffic and/or lower priority traffic (e.g., via serial processing, parallel processing, and/or the like). In this way, the second network device may process high priority traffic with appropriate processors, which may improve processing performance of the second network device.

As further shown in FIG. 1E, and by reference number 150, the second network device may process the second traffic with a second set of processors to generate processed second traffic, and may provide the processed second traffic to the second endpoint device. In some implementations, the second set of processors may be dedicated to the second security association so that the second set of processors can process the second traffic with the second priority (e.g., low or lower priority traffic). The second set of processors may include processors capable of processing low or lower priority traffic (e.g., via serial processing, parallel processing, and/or the like). In this way, the second network device may process low or lower priority traffic with appropriate processors, which may improve processing performance of the second network device.

Figure 1F:
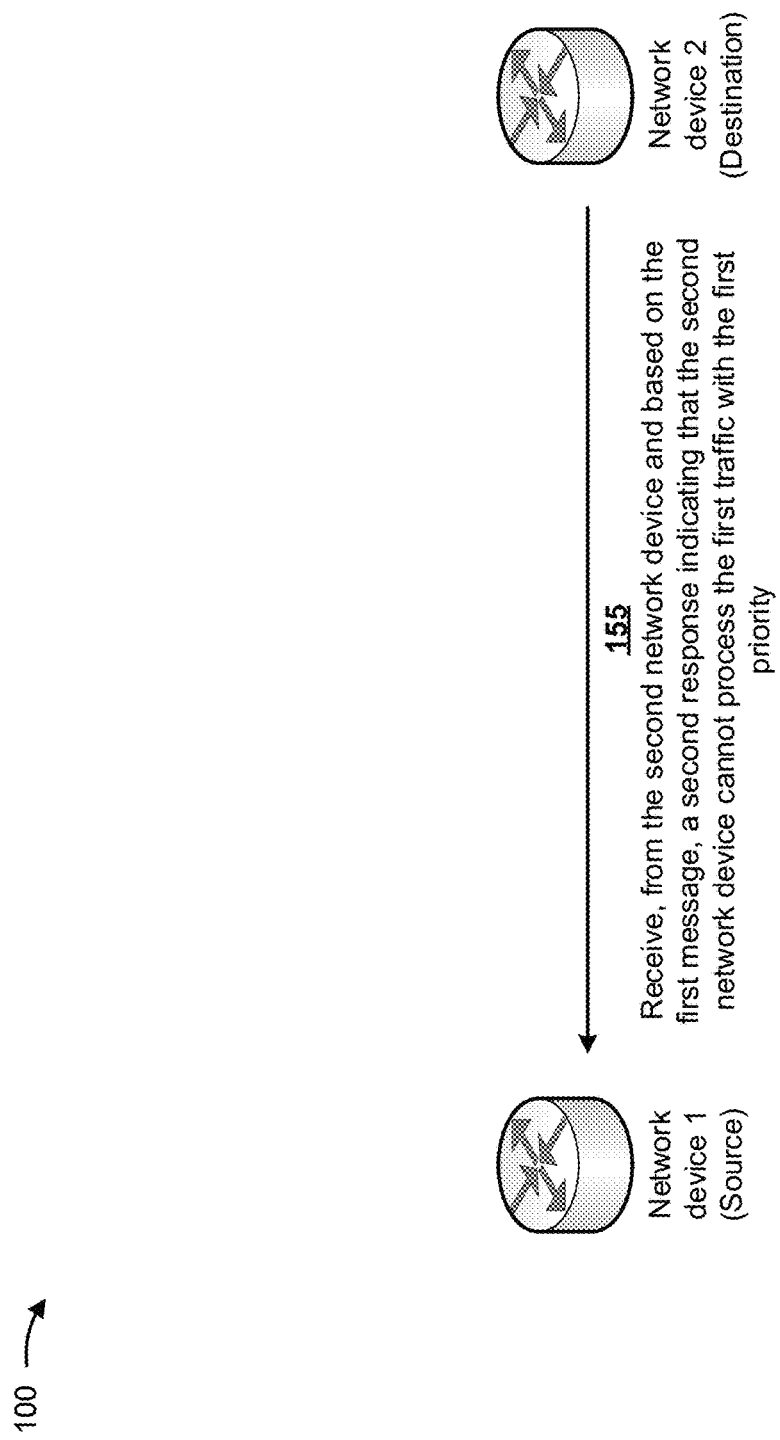

In some implementations, and as shown in FIG. 1F by reference number 155, the first network device may receive, from the second network device and based on the first message, a second response (e.g., an IKE message) indicating that the second network device cannot process the first traffic with the first priority. In such implementations, the second response may be received instead of the second response described above in connection with FIG. 1B. The second response may include a value indicating that the second network device cannot process the first traffic with the first priority. For example, the value may indicate that the second network device is non-enabled for processing high priority traffic, that the first network device and the second network device do not support the same quantity of security associations, and/or the like.

Figure 1G:
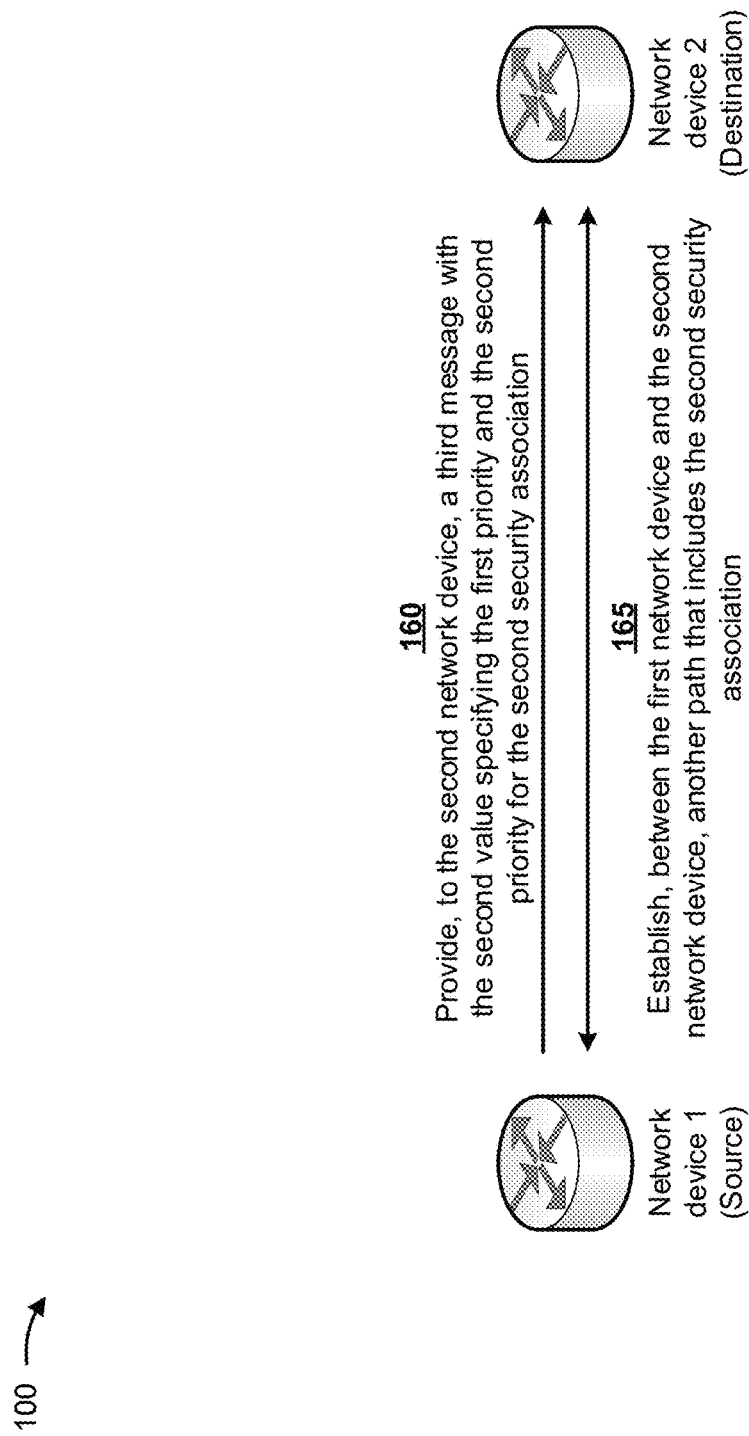

As shown in FIG. 1G, and by reference number 160, the first network device (e.g., based on the second response) may provide, to the second network device, a third message with the second value specifying the first priority and the second priority for the second security association. In some implementations, the third message may include a third IKE message. In some implementations, the second value of the third message may include an IKE payload type value that indicates which priority or quality of service traffic is to be carried over each of the security associations negotiated between the first network device and the second network device. For example, since the second network device cannot process the first traffic with the first priority, the second value may indicate that the first traffic with the first priority and the second traffic with the second priority are to be carried over the second security association.

As further shown in FIG. 1G, and by reference number 165, the first network device may establish, between the first network device and the second network device, another path that includes the second security association. In some implementations, the second security association of the path may be utilized to transmit the first traffic with the first priority and the the second traffic with the second priority.

Figure 1H:
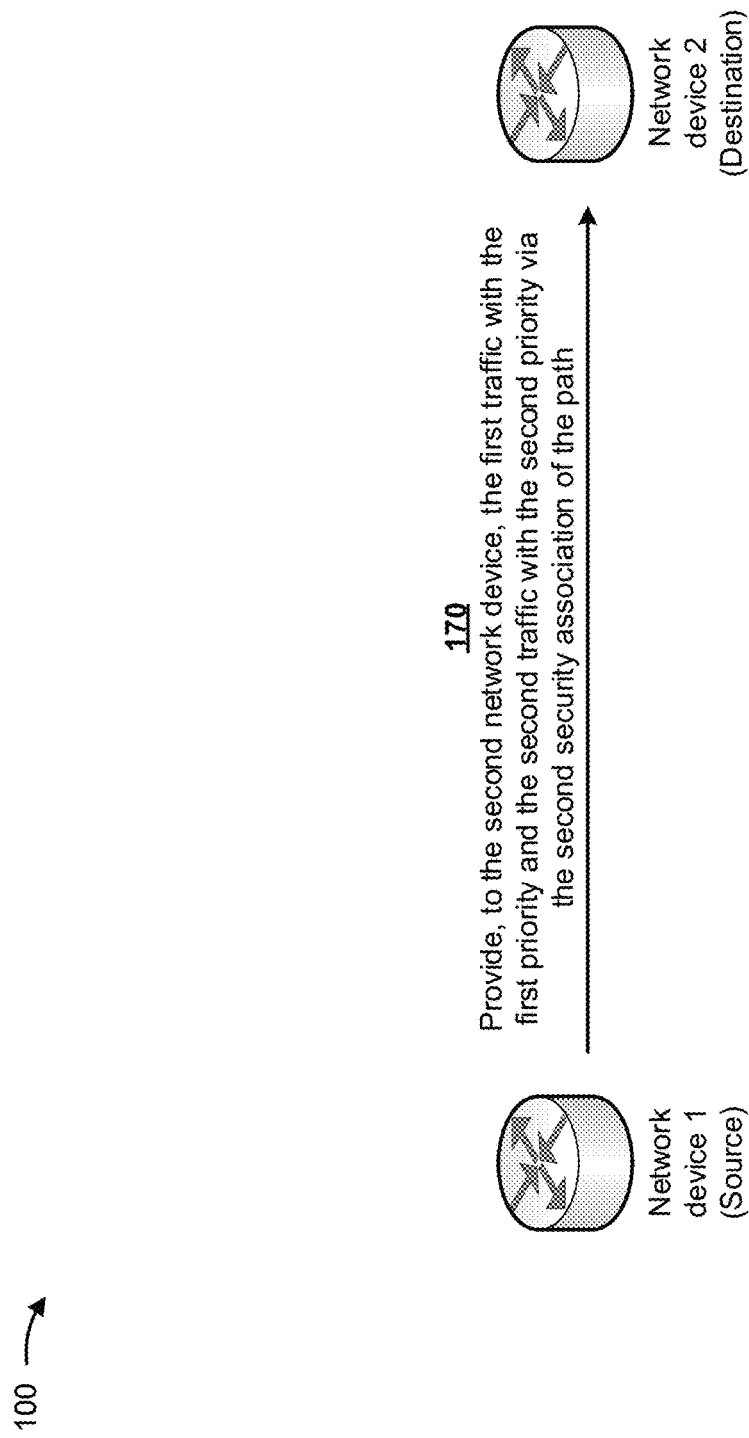

As shown in FIG. 1H, and by reference number 170, the first network device may provide, to the second network device, the first traffic with the first priority and the second traffic with the second priority, via the second security association of the path. For example, the first network device may encrypt the first traffic and the second traffic with the second cryptographic model and the second traffic encryption key, and may provide the encrypted first traffic and second traffic to the second network device via the path. The second network device may receive the encrypted first traffic and second traffic, and may decrypt the encrypted first traffic and traffic with the second cryptographic model and the second traffic encryption key.

By identifying priorities for traffic and processing the traffic based on the priorities, implementations described herein may ensure that traffic delays in the network will have a minimal impact on the anti-replay window. Implementations described herein may remove constraints on traffic transport, such as fragmentation, and may reduce packet reordering for traffic since each packet may be processed in an incoming order and/or placed on hold until a network resource is ready to process the packet.

In this way, traffic may be efficiently routed through a network and to an endpoint device, which reduces or prevents traffic outages in the network (e.g., that cause the traffic to be lost, cause the traffic to be delayed, require re-routing of traffic, and/or the like). This conserves computing resources (e.g., processing resources, memory resources, and/or the like), network resources, and/or the like that would otherwise be wasted in identifying and/or correcting the traffic outage, re-routing traffic, locating lost traffic, and/or the like. Furthermore, implementations described herein use a rigorous, computerized process to perform tasks that were not previously performed. For example, currently there does not exist a technique that provides predictable quality of service traffic steering.

As indicated above, FIGS. 1A-1H are provided merely as examples. Other examples may differ from what is described with regard to FIGS. 1A-1H.

Figure 2:
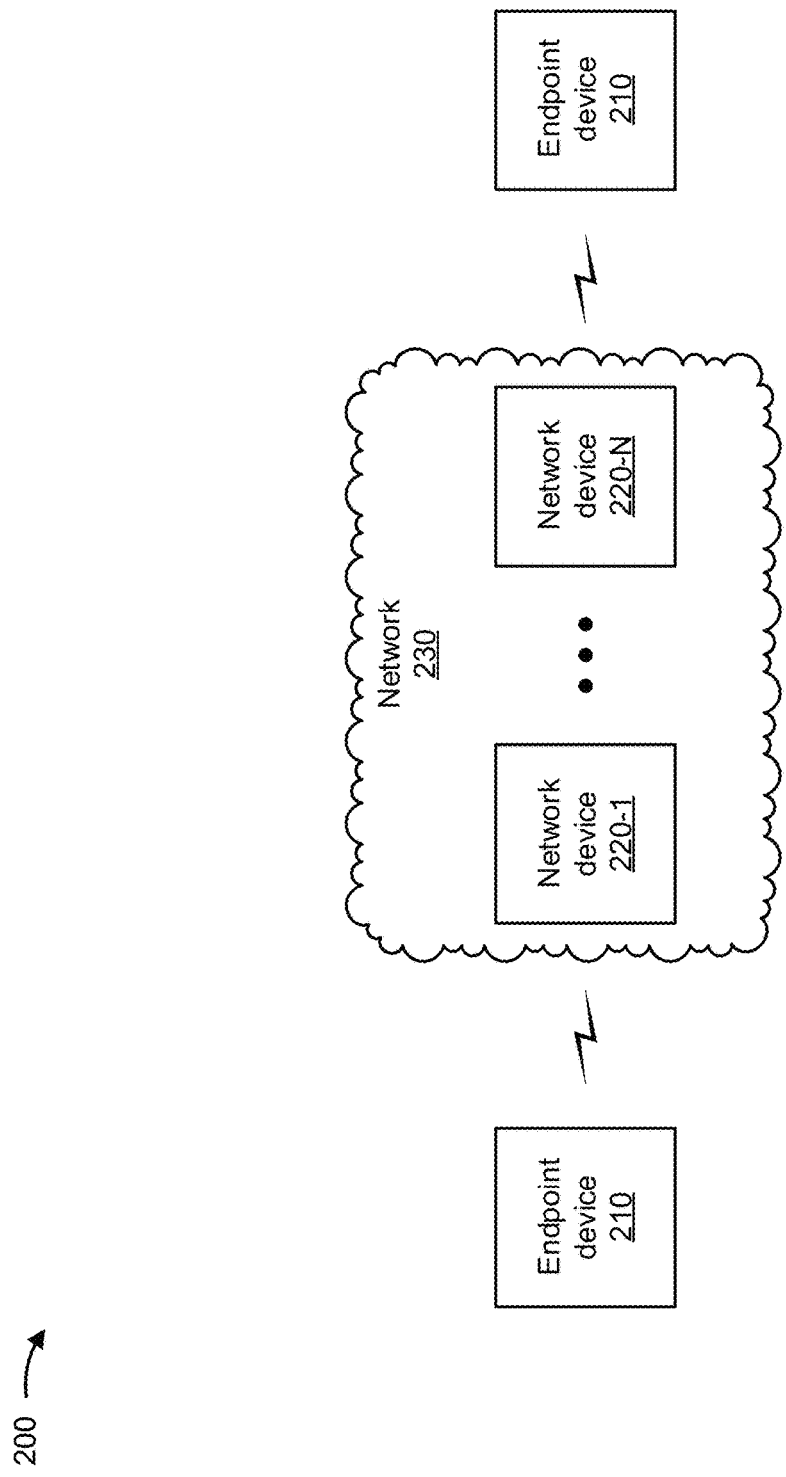
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include multiple endpoint devices 210, a group of network devices 220 (shown as network device 220-1 through network device 220-N), and a network 230. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), a network device, or a similar type of device. In some implementations, endpoint device 210 may receive network traffic from and/or may provide network traffic to other endpoint devices 210, via network 230 (e.g., by routing packets using network devices 220 as intermediaries).

Network device 220 includes one or more devices capable of receiving, processing, storing, routing, and/or providing traffic (e.g., a packet, other information or metadata, and/or the like) in a manner described herein. For example, network device 220 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 220 may include a gateway, a switch, a firewall, a hub, a bridge, a reverse proxy, a server (e.g., a proxy server, a cloud server, a data center server, and/or the like), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
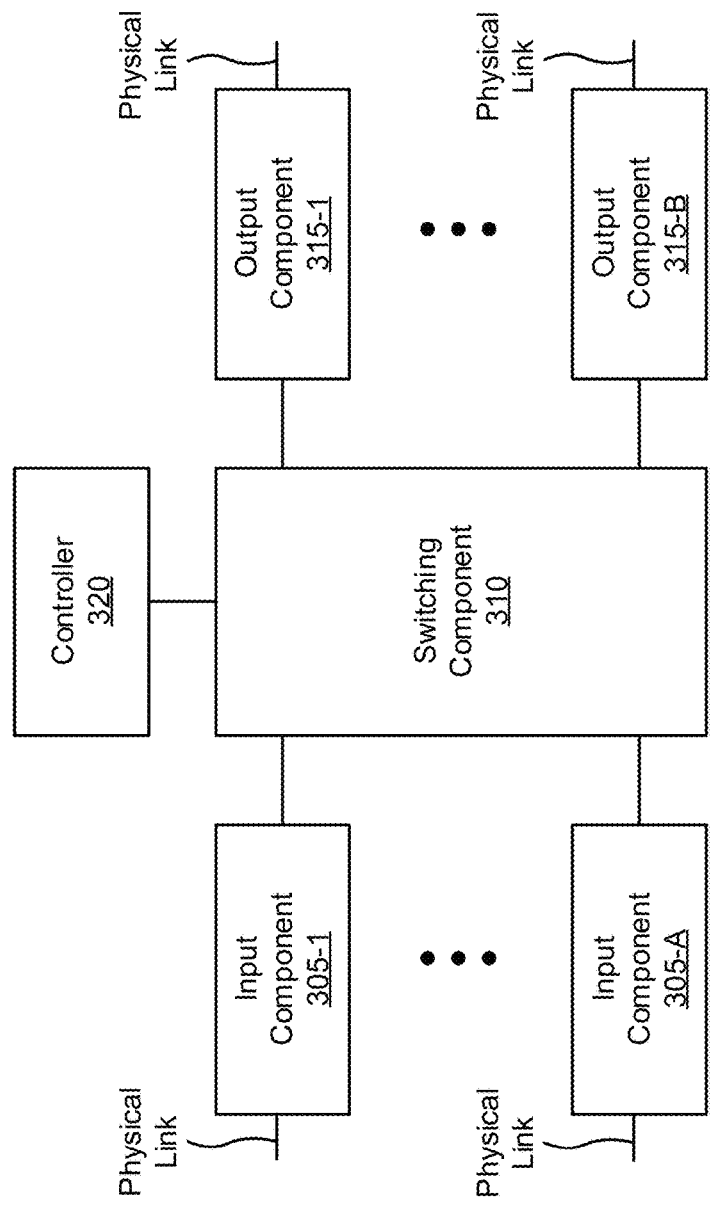
FIGS. 3 and 4 are diagram of example components of one or more devices of FIG. 2.

FIG. 3 is a diagram of example components of a device 300. Device 300 may correspond to network device 220. In some implementations, network device 220 may include one or more devices 300 and/or one or more components of device 300. As shown in FIG. 3, device 300 may include one or more input components 305-1 through 305-A (A≥1) (hereinafter referred to collectively as input components 305, and individually as input component 305), a switching component 310, one or more output components 315-1 through 315-B (B≥1) (hereinafter referred to collectively as output components 315, and individually as output component 315), and a controller 320.

Input components 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor or processing component. The processor is implemented in hardware, firmware, and/or a combination of software and hardware. In some implementations, controller 320 may include one or more processors that can be programmed to perform a function.

In some implementations, controller 320 may include a random-access memory (RAM), a read only memory (ROM), and/or another type of dynamic or static storage device (e.g., a flash memory, a magnetic memory, an optical memory, and/or the like) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets. In some cases, controller 320 may create a session table based on information determined while initializing a link fault detection session and may forward the session table to input components 305 and/or output components 315.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
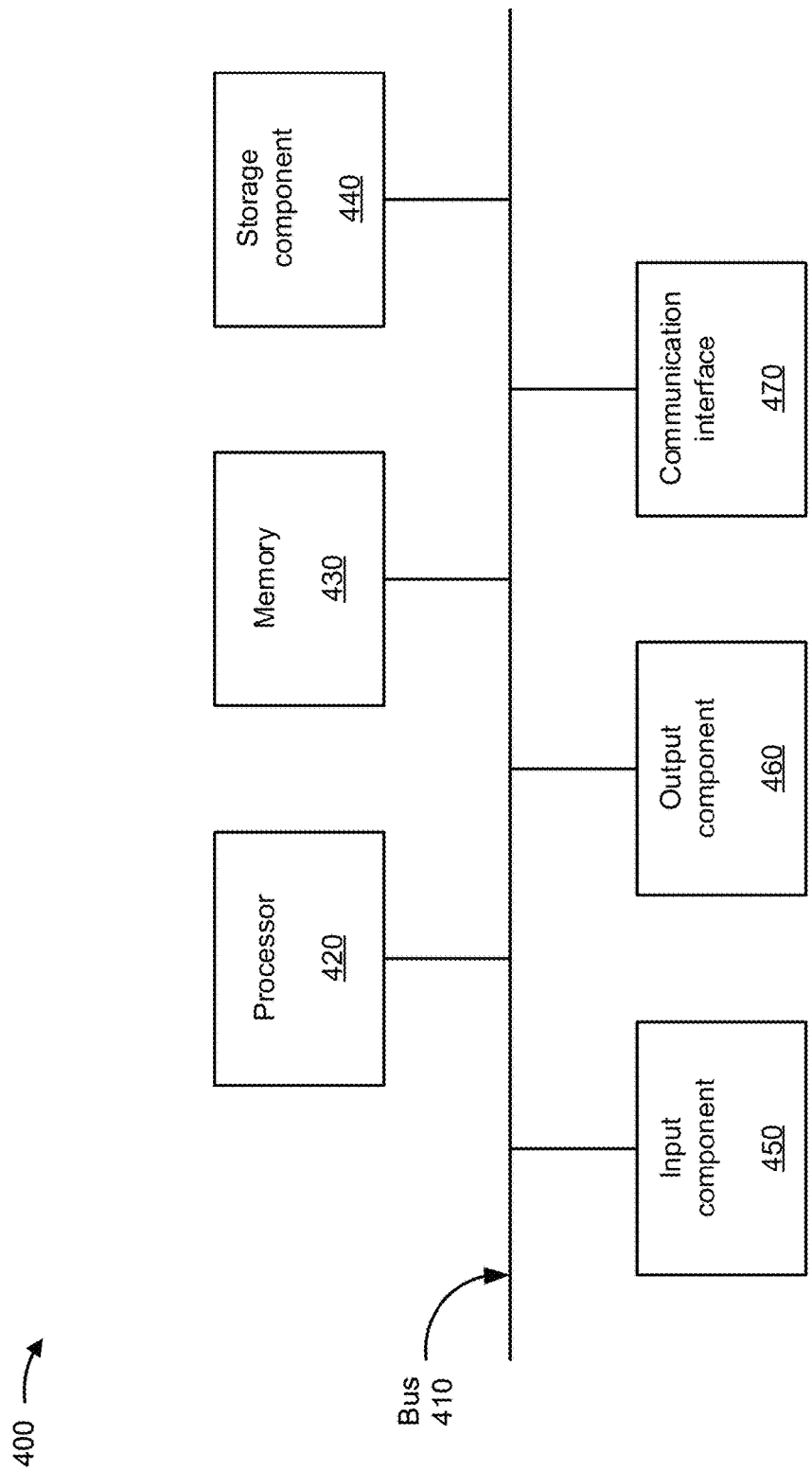

FIG. 4 is a diagram of example components of a device 400. Device 400 may correspond to endpoint device 210 and/or network device 220. In some implementations, endpoint device 210 and/or network device 220 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flow chart of an example process 500 for providing predictable quality of service traffic steering. In some implementations, one or more process blocks of FIG. 5 may be performed by a first network device (e.g., network device 220). In some implementations, one or more process blocks of FIG. 5 may be performed by another device or a group of devices separate from or including the network device, such as an endpoint device (e.g., endpoint device 210).

As shown in FIG. 5, process 500 may include receiving, by a first network device of a network, first traffic and second traffic, wherein the first traffic and the second traffic originated from an endpoint device associated with the network (block 510). For example, the first network device (e.g., using input component 305, switching component 310, controller 320, and/or the like) may receive first traffic and second traffic, as described above. In some implementations, the first traffic and the second traffic may originate from an endpoint device associated with the network.

As further shown in FIG. 5, process 500 may include assigning a first priority to the first traffic and a second priority to the second traffic, wherein the first priority is greater than the second priority (block 520). For example, the first network device (e.g., using switching component 310, controller 320, and/or the like) may assign a first priority to the first traffic and a second priority to the second traffic, as described above. In some implementations, the first priority may be greater than the second priority.

As further shown in FIG. 5, process 500 may include providing, to a second network device, a first message requesting whether the second network device can process the first traffic with the first priority (block 530). For example, the first network device (e.g., switching component 310, output component 315, controller 320, and/or the like) may provide, to a second network device, a first message requesting whether the second network device can process the first traffic with the first priority, as described above.

As further shown in FIG. 5, process 500 may include receiving, from the second network device and based on the first message, a first response with a first value indicating that the second network device can process the first traffic with the first priority (block 540). For example, the first network device (e.g., using input component 305, switching component 310, controller 320, and/or the like) may receive, from the second network device and based on the first message, a first response with a first value indicating that the second network device can process the first traffic with the first priority, as described above.

As further shown in FIG. 5, process 500 may include providing, to the second network device, a second message with a second value specifying the first priority for a first security association and the second priority for a second security association (block 550). For example, the first network device (e.g., using switching component 310, output component 315, controller 320, and/or the like) may provide, to the second network device, a second message with a second value specifying the first priority for a first security association and the second priority for a second security association, as described above.

As further shown in FIG. 5, process 500 may include establishing, with the second network device, a path that includes the first security association and the second security association (block 560). For example, the first network device (e.g., using switching component 310, output component 315, controller 320, and/or the like) may establish, with the second network device, a path that includes the first security association and the second security association, as described above.

As further shown in FIG. 5, process 500 may include providing, to the second network device, the first traffic, with the first priority, via the first security association of the path (block 570). For example, the first network device (e.g., using switching component 310, output component 315, controller 320, and/or the like) may provide, to the second network device, the first traffic, with the first priority, via the first security association of the path, as described above.

As further shown in FIG. 5, process 500 may include providing, to the second network device, the second traffic, with the second priority, via the second security association of the path (block 580). For example, the first network device (e.g., using switching component 310, output component 315, controller 320, and/or the like) may provide, to the second network device, the second traffic, with the second priority, via the second security association of the path, as described above.

Process 500 may include additional implementations, such as any single implementation or any combination of implementations described below and/or in connection with one or more other processes described elsewhere herein.

In some implementations, the first traffic with the first priority, being received via the first security association of the path, may cause the second network device to process the first traffic with a first set of processors to generate processed first traffic, and provide the processed first traffic to another endpoint device associated with the network. In some implementations, the second traffic with the second priority, being received via the second security association of the path, may cause the second network device to process the second traffic with a second set of processors to generate processed second traffic, and provide the processed second traffic to the other endpoint device associated with the network.

In some implementations, the first priority may provide a first quality of service for the first traffic, and the second priority may provide a second quality of service for the second traffic, where the first quality of service may be greater than the second quality of service. In some implementations, the first message may include a first Internet key exchange (IKE) message and the second message may include a second IKE message.

In some implementations, the first message may include information requesting whether the second network device is enabled or disabled to process the first traffic with the first priority, a quantity of security associations supported by the second network device, and/or the like. In some implementations, when providing the first traffic with the first priority, via the first security association of the path, the first network device may provide the first traffic, with the first priority, via the first security association of the path and without fragmentation of the first traffic.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for providing predictable quality of service traffic steering. In some implementations, one or more process blocks of FIG. 6 may be performed by a first network device (e.g., network device 220). In some implementations, one or more process blocks of FIG. 6 may be performed by another device or a group of devices separate from or including the network device, such as an endpoint device (e.g., endpoint device 210).

As shown in FIG. 6, process 600 may include receiving, by a first network device, first traffic and second traffic that originated from an endpoint device associated with a network (block 610). For example, the first network device (e.g., using input component 305, switching component 310, controller 320, and/or the like) may receive first traffic and second traffic that originated from an endpoint device associated with a network, as described above.

As further shown in FIG. 6, process 600 may include assigning a first priority to the first traffic and a second priority to the second traffic, wherein the first priority is greater than the second priority (block 620). For example, the first network device (e.g., using switching component 310, controller 320, and/or the like) may assign a first priority to the first traffic and a second priority to the second traffic, as described above. In some implementations, the first priority may be greater than the second priority.

As further shown in FIG. 6, process 600 may include providing, to a second network device, a first message requesting whether the second network device can process the first traffic with the first priority (block 630). For example, the first network device (e.g., using switching component 310, output component 315, controller 320, and/or the like) may provide, to a second network device, a first message requesting whether the second network device can process the first traffic with the first priority, as described above.

As further shown in FIG. 6, process 600 may include receiving, from the second network device and based on the first message, a first response with a first value indicating that the second network device can process the first traffic with the first priority (block 640). For example, the first network device (e.g., using input component 305, switching component 310, controller 320, and/or the like) may receive, from the second network device and based on the first message, a first response with a first value indicating that the second network device can process the first traffic with the first priority, as described above.

As further shown in FIG. 6, process 600 may include establishing, with the second network device, a path that includes a first security association and a second security association (block 650). For example, the first network device (e.g., using switching component 310, output component 315, controller 320, and/or the like) may establish, with the second network device, a path that includes a first security association and a second security association, as described above.

As further shown in FIG. 6, process 600 may include providing, to the second network device, the first traffic, with the first priority, via the first security association of the path (block 660). For example, the first network device (e.g., using switching component 310, output component 315, controller 320, and/or the like) may provide, to the second network device, the first traffic, with the first priority, via the first security association of the path, as described above.

As further shown in FIG. 6, process 600 may include providing, to the second network device, the second traffic, with the second priority, via the second security association of the path (block 670). For example, the first network device (e.g., using switching component 310, output component 315, controller 320, and/or the like) may provide, to the second network device, the second traffic, with the second priority, via the second security association of the path, as described above.

Process 600 may include additional implementations, such as any single implementation or any combination of implementations described below and/or in connection with one or more other processes described elsewhere herein.

In some implementations, the first network device may provide, to the second network device and prior to establishing the path, a second message with a second value specifying the first priority for the first security association and the second priority for the second security association. In some implementations, when providing the second traffic, with the second priority, via the second security association of the path, the first network device may provide the second traffic, with the second priority, via the second security association of the path and without fragmentation of the second traffic.

In some implementations, the first security association may provide shared security attributes between the first network device and the second network device to support secure communication of the first traffic. In some implementations, the shared security attributes may include an attribute identifying a cryptographic model, an attribute identifying a traffic encryption key, an attribute identifying parameters for communication of the first traffic via the path, and/or the like.

In some implementations, the second security association may provide shared security attributes between the first network device and the second network device to support secure communication of the second traffic. In some implementations, the shared security attributes may include an attribute identifying a cryptographic model, an attribute identifying a traffic encryption key, parameters for communication of the second traffic via the path, and/or the like.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 for providing predictable quality of service traffic steering. In some implementations, one or more process blocks of FIG. 7 may be performed by a first network device (e.g., network device 220). In some implementations, one or more process blocks of FIG. 7 may be performed by another device or a group of devices separate from or including the network device, such as an endpoint device (e.g., endpoint device 210).

As shown in FIG. 7, process 700 may include receiving, by a first network device, first traffic and second traffic from an endpoint device associated with a network (block 705). For example, the first network device (e.g., using input component 305, switching component 310, controller 320, and/or the like) may receive first traffic and second traffic from an endpoint device associated with a network, as described above.

As further shown in FIG. 7, process 700 may include assigning a first priority to the first traffic and a second priority to the second traffic, wherein the first priority is greater than the second priority (block 710). For example, the first network device (e.g., using switching component 310, controller 320, and/or the like) may assign a first priority to the first traffic and a second priority to the second traffic. In some implementations, the first priority may be greater than the second priority.

As further shown in FIG. 7, process 700 may include providing, to a second network device, a first message requesting whether the second network device can process the first traffic with the first priority (block 715). For example, the first network device (e.g., using switching component 310, output component 315, controller 320, and/or the like) may provide, to a second network device, a first message requesting whether the second network device can process the first traffic with the first priority, as described above.

As further shown in FIG. 7, process 700 may include receiving, from the second network device and based on the first message, a first response with a first value indicating whether the second network device can process the first traffic with the first priority (block 720). For example, the first network device (e.g., using input component 305, switching component 310, controller 320, and/or the like) may receive, from the second network device and based on the first message, a first response with a first value indicating whether the second network device can process the first traffic with the first priority, as described above.

As further shown in FIG. 7, process 700 may include providing, to the second network device and when the second network device can process the first traffic with the first priority, a second message with a second value specifying the first priority for a first security association and the second priority for a second security association (block 725). For example, the first network device (e.g., using switching component 310, output component 315, controller 320, and/or the like) may provide, to the second network device and when the second network device can process the first traffic with the first priority, a second message with a second value specifying the first priority for a first security association and the second priority for a second security association, as described above.

As further shown in FIG. 7, process 700 may include providing, to the second network device and when the second network device cannot process the first traffic with the first priority, a third message with a third value specifying the first priority and the second priority for the second security association (block 730). For example, the first network device (e.g., using switching component 310, output component 315, controller 320, and/or the like) may provide, to the second network device and when the second network device cannot process the first traffic with the first priority, a third message with a third value specifying the first priority and the second priority for the second security association, as described above.

As further shown in FIG. 7, process 700 may include establishing, with the second network device and when the second network device can process the first traffic with the first priority, a first path that includes the first security association and the second security association (block 735). For example, the first network device (e.g., using switching component 310, output component 315, controller 320, and/or the like) may establish, with the second network device and when the second network device can process the first traffic with the first priority, a first path that includes the first security association and the second security association, as described above.

As further shown in FIG. 7, process 700 may include establishing, with the second network device and when the second network device cannot process the first traffic with the first priority, a second path that includes the second security association and not the first security association (block 740). For example, the first network device (e.g., using switching component 310, output component 315, controller 320, and/or the like) may establish, with the second network device and when the second network device cannot process the first traffic with the first priority, a second path that includes the second security association and not the first security association, as described above.

As further shown in FIG. 7, process 700 may include providing, to the second network device, the first traffic with the first priority, via the first security association of the first path or via the second security association of the second path (block 745). For example, the first network device (e.g., using switching component 310, output component 315, controller 320, and/or the like) may provide, to the second network device, the first traffic with the first priority, via the first security association of the first path or via the second security association of the second path, as described above.

As further shown in FIG. 7, process 700 may include providing, to the second network device, the second traffic with the second priority, via the second security association of the first path or via the second security association of the second path (block 750). For example, the first network device (e.g., using switching component 310, output component 315, controller 320, and/or the like) may provide, to the second network device, the second traffic with the second priority, via the second security association of the first path or via the second security association of the second path, as described above.

Process 700 may include additional implementations, such as any single implementation or any combination of implementations described below and/or in connection with one or more other processes described elsewhere herein.

In some implementations, the first priority may provide a first quality of service for the first traffic and the second priority may provide a second quality of service for the second traffic, where the first quality of service may be greater than the second quality of service. In some implementations, the first message may include a first Internet key exchange (IKE) message and the second message may include a second IKE message.

In some implementations, the first message may include information requesting whether the second network device is enabled or disabled to process the first traffic with the first priority, a quantity of security associations supported by the second network device, and/or the like. In some implementations, the first security association may provide shared security attributes between the first network device and the second network device to support secure communication of the first traffic. In some implementations, the shared security attributes may include an attribute identifying a cryptographic model, an attribute identifying a traffic encryption key, an attribute identifying parameters for communication of the first traffic via the path, and/or the like.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a first network device of a network, first traffic and second traffic,
      wherein the first traffic and the second traffic originated from an endpoint device associated with the network;
   assigning, by the first network device, a first priority to the first traffic and a second priority to the second traffic,
      wherein the first priority is greater than the second priority;
   providing, by the first network device and to a second network device, a first message requesting whether the second network device can process the first traffic with the first priority;
   receiving, by the first network device, from the second network device, and based on the first message, a first response with a first value indicating that the second network device can process the first traffic with the first priority;
   providing, by the first network device and to the second network device, a second message with a second value specifying:
      the first priority for a first security association, and
      the second priority for a second security association;
   establishing, by the first network device and with the second network device, a path that includes the first security association and the second security association;
   providing, by the first network device and to the second network device, the first traffic, with the first priority, via the first security association of the path;
   providing, by the first network device and to the second network device, the second traffic, with the second priority, via the second security association of the path;
   providing, by the first network device and to a third network device, a third message requesting whether the third network device can process the first traffic with the first priority and the second traffic with the second priority;
   receiving, by the first network device, from the third network device, and based on the third message, a second response with a first value indicating that the third network device cannot process the first traffic with the first priority,
      the first value indicating that the third network device is non-enabled for processing the first traffic with the first priority;
   establishing, by the first network device and with the third network device, another path that includes the second security association; and
   providing, by the first network device and based on the second response, the first traffic with the first priority and the second traffic with the second priority via the other path.

2. The method of claim 1, wherein the first traffic with the first priority, being received via the first security association of the path, is to cause the second network device to:
process the first traffic with a first set of processors to generate processed first traffic, and
provide the processed first traffic to another endpoint device associated with the network.

3. The method of claim 2, wherein the second traffic with the second priority, being received via the second security association of the path, is to cause the second network device to:
process the second traffic with a second set of processors to generate processed second traffic, and
provide the processed second traffic to the other endpoint device associated with the network.

4. The method of claim 1, wherein:
the first priority provides a first quality of service for the first traffic, and
the second priority provides a second quality of service for the second traffic,
wherein the first quality of service is greater than the second quality of service.

5. The method of claim 1, wherein:
the first message includes a first Internet key exchange (IKE) message, and
the second message includes a second IKE message.

6. The method of claim 1, wherein the first message includes information requesting:
whether the second network device is enabled or disabled to process the first traffic with the first priority, and
a quantity of security associations supported by the second network device.

7. The method of claim 1, wherein providing the first traffic with the first priority, via the first security association of the path, includes:
providing the first traffic, with the first priority, via the first security association of the path and without fragmentation of the first traffic.

8. A first network device, comprising:
one or more memories; and
one or more processors to:
receive first traffic and second traffic that originated from an endpoint device associated with a network;
assign a first priority to the first traffic and a second priority to the second traffic,
wherein the first priority is greater than the second priority;
provide, to a second network device, a first message requesting whether the second network device can process the first traffic with the first priority;
receive, from the second network device and based on the first message, a first response with a first value indicating that the second network device can process the first traffic with the first priority;
establish, with the second network device, a path that includes a first security association and a second security association;
provide, to the second network device, the first traffic, with the first priority, via the first security association of the path;
provide, to the second network device, the second traffic, with the second priority, via the second security association of the path;
provide, to a third network device, a third message requesting whether the third network device can process the first traffic with the first priority and the second traffic with the second priority;
receive, from the third network device and based on the third message, a second response with a first value indicating that the third network device cannot process the first traffic with the first priority,
the first value indicating that the third network device is non-enabled for processing the first traffic with the first priority;
establish, with the third network device, another path that includes the second security association; and
provide, based on the second response, the first traffic with the first priority and the second traffic with the second priority via the other path.

9. The first network device of claim 8, wherein the one or more processors are further to:
provide, to the second network device and prior to establishing the path, a second message with a second value specifying:
the first priority for the first security association, and
the second priority for the second security association.

10. The first network device of claim 8, wherein the one or more processors, when providing the second traffic, with the second priority, via the second security association of the path, are to:
provide the second traffic, with the second priority, via the second security association of the path and without fragmentation of the second traffic.

11. The first network device of claim 8, wherein the first security association provides shared security attributes between the first network device and the second network device to support secure communication of the first traffic.

12. The first network device of claim 11, wherein the shared security attributes include one or more of:
an attribute identifying a cryptographic model,
an attribute identifying a traffic encryption key, or
an attribute identifying parameters for communication of the first traffic via the path.

13. The first network device of claim 8, wherein the second security association provides shared security attributes between the first network device and the second network device to support secure communication of the second traffic.

14. The first network device of claim 11, wherein the shared security attributes include one or more of:
an attribute identifying a cryptographic model,
an attribute identifying a traffic encryption key, or
parameters for communication of the second traffic via the path.

15. A non-transitory computer-readable medium storing instructions, the instructions comprising:
one or more instructions that, when executed by one or more processors of a first network device, cause the one or more processors to:
receive first traffic and second traffic from an endpoint device associated with a network;
assign a first priority to the first traffic and a second priority to the second traffic,
wherein the first priority is greater than the second priority;
provide, to a second network device, a first message requesting whether the second network device can process the first traffic with the first priority;
receive, from the second network device and based on the first message, a first response with a first value indicating whether the second network device can process the first traffic with the first priority;

provide, to the second network device and when the second network device can process the first traffic with the first priority, a second message with a second value specifying:
  the first priority for a first security association, and the second priority for a second security association;
provide, to the second network device and when the second network device cannot process the first traffic with the first priority, a third message with a third value specifying the first priority and the second priority for the second security association;
establish, with the second network device and when the second network device can process the first traffic with the first priority, a first path that includes the first security association and the second security association;
establish, with the second network device and when the second network device cannot process the first traffic with the first priority, a second path that includes the second security association and not the first security association;
provide, to the second network device, the first traffic with the first priority, via the first security association of the first path or via the second security association of the second path;
provide, to the second network device, the second traffic with the second priority, via the second security association of the first path or via the second security association of the second path;
provide, to a third network device, a third message requesting whether the third network device can process the first traffic with the first priority and the second traffic with the second priority;
receive, from the third network device and based on the third message, a second response with a first value indicating that the third network device cannot process the first traffic with the first priority,
  the first value indicating that the third network device is non-enabled for processing the first traffic with the first priority;
establish, with the third network device, another path that includes the second security association; and
provide, based on the second response, the first traffic with the first priority and the second traffic with the second priority via the other path.

16. The non-transitory computer-readable medium of claim 15, wherein:
the first priority provides a first quality of service for the first traffic, and
the second priority provides a second quality of service for the second traffic,
  wherein the first quality of service is greater than the second quality of service.

17. The non-transitory computer-readable medium of claim 15, wherein:
the first message includes a first Internet key exchange (IKE) message, and
the second message includes a second IKE message.

18. The non-transitory computer-readable medium of claim 15, wherein the first message includes information requesting:
whether the second network device is enabled or disabled to process the first traffic with the first priority, and
a quantity of security associations supported by the second network device.

19. The non-transitory computer-readable medium of claim 15, wherein the first security association provides shared security attributes between the first network device and the second network device to support secure communication of the first traffic.

20. The non-transitory computer-readable medium of claim 19, wherein the shared security attributes include one or more of:
an attribute identifying a cryptographic model,
an attribute identifying a traffic encryption key, or
an attribute identifying parameters for communication of the first traffic via the path.

* * * * *